(No Model.)
J. W. McINTIRE.
BICYCLE.
No. 566,275.  Patented Aug. 18, 1896.
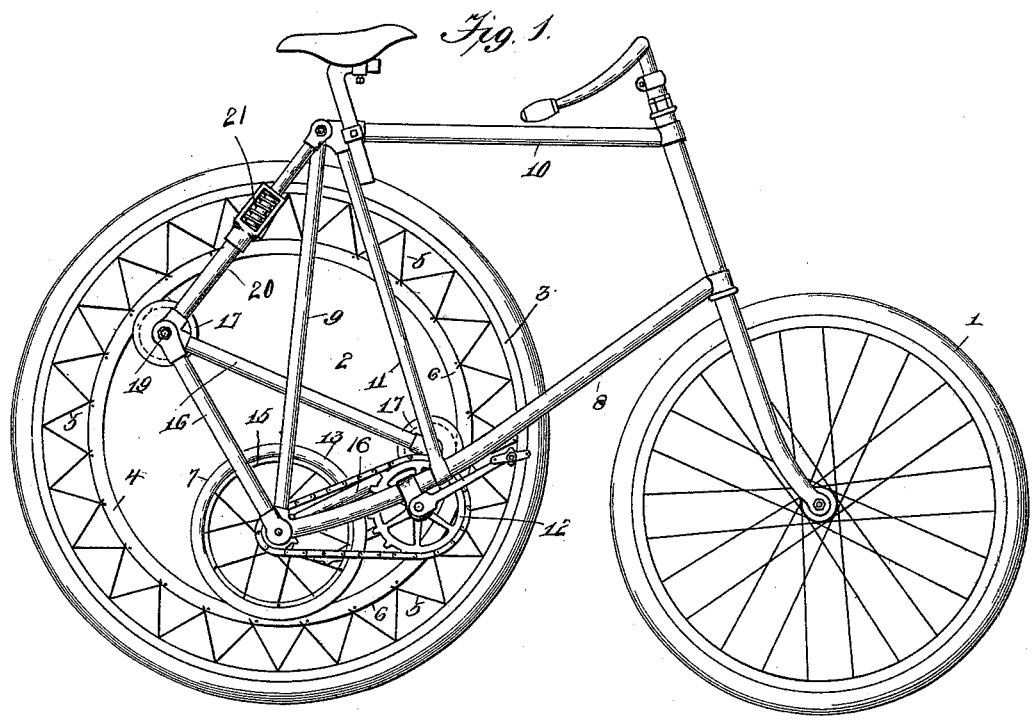
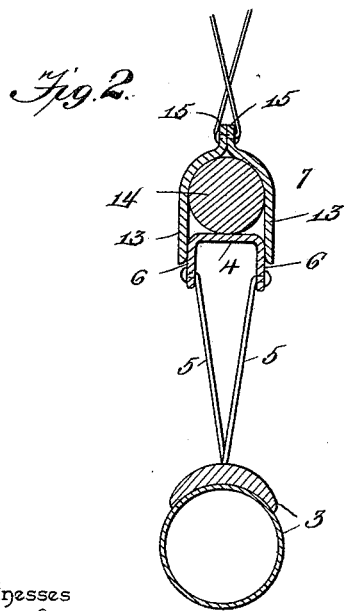
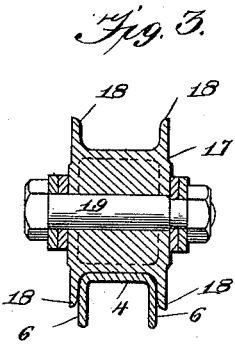
Witnesses
John C. Shaw
R. M. Smith
Inventor
John W. McIntire,
By his Attorneys,
C. A. Snow & Co.

UNITED STATES PATENT OFFICE.

JOHN W. McINTIRE, OF CHICAGO, ILLINOIS.

BICYCLE.

SPECIFICATION forming part of Letters Patent No. 566,275, dated August 18, 1896.

Application filed March 8, 1895. Serial No. 541,021. (No model.)

*To all whom it may concern:*

Be it known that I, JOHN W. McINTIRE, a citizen of the United States, residing at the city of Chicago, in the county of Cook and State of Illinois, have invented a new and Improved Bicycle, of which the following is a full and exact specification.

This invention relates to an improvement in that class of bicycles known as the "safety" pattern, and has for its object to provide a simple and efficient driving mechanism by means of which greatly-increased speed may be attained and the machine geared to any desired point.

A further object of the invention is to provide a novel construction of bicycle-frame by means of which the track-wheel may be properly supported and guided, the required pressure applied directly to the driving friction-wheel, and the desired spring or elasticity afforded for absorbing the vibration and preventing the same from being communicated to the rider's seat.

Other objects and advantages of the invention will appear in the course of the subjoined description.

The invention consists in certain novel features and details of construction and arrangement of parts, as hereinafter fully described, illustrated in the drawings, and finally pointed out in the claims.

In the accompanying drawings, Figure 1 is a side elevation of a bicycle constructed in accordance with the present invention. Fig. 2 is an enlarged detail sectional view through the rim of the friction-wheel and the inner rim of the track-wheel. Fig. 3 is an enlarged detail sectional view of one of the driving-wheels, showing also its relation to the inner rim of the track-wheel.

Similar numerals of reference designate corresponding parts in the several figures of the drawings.

Referring to the accompanying drawings, 1 designates the front or steering wheel of a safety-bicycle, and 2 the rear wheel, to which the driving-power is transmitted. This rear wheel is constructed with an open center and in reality constitutes a circular track upon which the driving friction-wheel of the machine rests and runs. The track-wheel 2 comprises an outer rim 3 of crescent shape, in which is arranged either a solid cushion or pneumatic tire, and also an inner rim 4, concentric to the outer rim and connected rigidly thereto by means of a series of interposed laced spokes 5. The inner rim 4 of the track-wheel is substantially U-shaped in cross-section, comprising a flat horizontal bearing-surface and a pair of circumferential flanges 6 extending in parallel relation to each other and at right angles to the central or horizontal portion of the rim, as shown in Fig. 2. These circumferential flanges are perforated at suitable intervals and receive the headed inner ends of the spokes 5, thus giving a neat and ornamental appearance to the track-wheel and rendering the same easy of repair when necessary.

7 designates the driving-wheel, from which motion is communicated directly to the track-wheel 2. This driving-wheel is mounted in the rear end of what is ordinarily termed the "reach" 8 of the machine-frame and is braced from the saddle and adapted to have the weight of the rider communicated directly thereto by means of a substantially vertical bar 9, one of which is arranged upon each side of the track-wheel and extended upwardly to and connected with the upper main horizontal bar 10 of the machine-frame. An additional brace 11 extends from the junction of the bars 9 and 10 downward to the reach 8 and connects rigidly therewith at a point in proximity to the bearing-bracket, in which the shaft of the main sprocket-wheel 12 is mounted, thus serving to brace such shaft, which also constitutes the crank-axle and obviates twisting the frame.

The rim of the driving-wheel 7 is composed of two equal and similar metal rings 13, the inner adjacent faces of which are concaved to receive a friction tire or band 14, preferably of rubber and round in cross-section. Each of said rings is formed with an inwardly-projecting annular flange 15, by means of which the said rings are united to form a rim, said flanges also being perforated in transverse alinement to receive the outer headed extremities of the wheel-spokes in the manner indicated in Fig. 2. The peripheral flanges of the rim thus formed are extended sufficiently to rest upon either side of and embrace the inner rim 4 of the track-wheel 2, so that the tire or band 14 will rest with the full weight of the rider against the inner flat surface of said inner rim and obtain a firm frictional hold thereon, while the oppositely-disposed flanges of the driving or friction wheel rim are capable of playing freely against the sides of the inner rim of the track-wheel for accommodating the compression of the tire or band 14, and at the same time preventing any liability of the displacement of the driving or friction wheel with relation to the track-wheel. By reason of the inner faces of the outwardly-projecting flanges of the driving-wheel rim being parallel with each other and parallel with the opposite outer faces of the circumferential flanges of the inner rim of the track-wheel, which are also parallel to each other, the two rims are capable of sliding and adjusting themselves relatively to each other, thus compensating for inequalities in the surface traveled over, and keeping the friction driving-wheel in constant working engagement with the track-wheel. The shaft of the driving friction-wheel 7 is provided with a fixed sprocket-pinion, which receives the drive-chain from the main sprocket-wheel 12 on the crank-axle, as shown in Fig. 1.

In order to guide the track-wheel 2 and hold the same against wabbling or lateral play, a triangular frame 16 is provided, the said frame being connected to the main frame of the machine at a point coincident with the axial center of the driving friction-wheel 7. Journaled at the other angle of this triangular supplemental frame 16 are two guiding-wheels 17, each provided with oppositely-disposed circumferential flanges 18, extending in parallel relation and spaced apart sufficiently to embrace the sides of the inner rim of the track-wheel 2, in the manner shown in Fig. 3. These wheels are journaled on suitable spindles or stud-shafts 19, carried by the triangular frame 16, and are capable of running freely against the inner surface of the inner rim 4, thus supporting the track-wheel against lateral movement.

20 designates a brace which is interposed between the rear end of the upper main horizontal bar 10 of the machine-frame and the rear corner of the supplemental triangular frame 16. This brace is made in two sections and their adjacent ends are coupled together in such manner as to permit of longitudinal contraction and expansion, the amount of which is influenced by a spiral spring 21, as shown. This spring serves to cushion the weight of the rider and prevents such weight being transferred to the supplemental frame 16 in such a way as to cause the latter to bind against the inner rim 4.

From the foregoing description it will be seen that a very simple and efficient driving-gear for bicycles is obtained, in which the speed may be increased as desired by changing the relative sizes of the two sprocket-wheels. It is also possible to construct the track-wheel of different sizes, both as regards the outer rim and the inner rim. By constructing the supplemental triangular frame independently of the main frame and connecting it with said main frame by means of an extensible brace the said supplemental frame may accommodate itself to the vibrations of the track-wheel and thus prevent frictional binding which would otherwise occur.

Various changes in the form, proportion, and minor details of construction may be resorted to without departing from the spirit or sacrificing any of the advantages of this invention.

Having described the invention, what is claimed is—

1. In a safety-bicycle, the combination with the machine-frame and with one of the ground-wheels having an open rim, of a friction driving-wheel journaled in the machine-frame and operating against the inner face of said open rim, means for driving said friction-wheel, and a supplemental triangular frame having a yielding connection with the main frame and arranged within said open rim and also provided at its angles with guiding rollers or wheels, substantially as and for the purpose set forth.

2. In a bicycle, the combination with the machine-frame and one of the ground-wheels having an open rim, of a friction driving-wheel journaled in the machine-frame and operating against the inner face of said open rim, means for driving said friction-wheel, a supplemental and independent frame arranged within said open rim and carrying guiding rollers or wheels, bearing against the open rim and an automatically extensible and contractible brace interposed between the main frame and supplemental frame, substantially as and for the purpose described.

In testimony whereof I have signed my name, in the presence of two subscribing witnesses, this 28th day of February, A. D. 1895.

J. W. McINTIRE.

Witnesses:
J. C. RISTENBATT,
CHARLES E. BURNAP.